(12) United States Patent
Du et al.

(10) Patent No.: US 8,260,009 B2
(45) Date of Patent: Sep. 4, 2012

(54) SYSTEM AND METHOD FOR MEASURING CLARITY OF IMAGES USED IN AN IRIS RECOGNITION SYSTEM

(75) Inventors: Yingzi Du, Indianapolis, IN (US); Craig S. Belcher, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 300 days.

(21) Appl. No.: 12/673,626

(22) PCT Filed: Aug. 15, 2008

(86) PCT No.: PCT/US2008/073298

§ 371 (c)(1),
(2), (4) Date: Feb. 16, 2010

(87) PCT Pub. No.: WO2009/023828

PCT Pub. Date: Feb. 19, 2009

(65) Prior Publication Data

US 2010/0202668 A1    Aug. 12, 2010

Related U.S. Application Data

(60) Provisional application No. 60/964,797, filed on Aug. 15, 2007.

(51) Int. Cl.
*G06K 9/00* (2006.01)
(52) U.S. Cl. ........................................ 382/117; 382/115
(58) Field of Classification Search .................. 382/115, 382/117, 127; 235/380; 340/5.1, 5.92; 704/246, 704/273; 902/3, 4, 25; 351/200, 204; 283/68; 356/71
See application file for complete search history.

(56) References Cited

U.S. PATENT DOCUMENTS

| | | | |
|---|---|---|---|
| 5,291,560 | A | 3/1994 | Daugman |
| 6,753,965 | B2 | 6/2004 | Kumar et al. |
| 2002/0052551 | A1 | 5/2002 | Sinclair et al. |
| 2003/0076984 | A1 | 4/2003 | Tisse et al. |
| 2005/0198056 | A1 | 9/2005 | Dumais et al. |
| 2005/0207614 | A1* | 9/2005 | Schonberg et al. ........... 382/100 |
| 2006/0210123 | A1 | 9/2006 | Kondo et al. |
| 2007/0036397 | A1* | 2/2007 | Hamza .......................... 382/117 |
| 2007/0047772 | A1 | 3/2007 | Matey et al. |
| 2007/0274570 | A1* | 11/2007 | Hamza .......................... 382/117 |
| 2007/0274571 | A1* | 11/2007 | Hamza .......................... 382/117 |
| 2008/0219515 | A1* | 9/2008 | Namgoong .................... 382/117 |

OTHER PUBLICATIONS

Chen et al, "Localized Iris Image Quality Using 2-D Wavelets", LNCS, 2005, vol. 3832, pp. 373-381.*
International Search Report and Written Opinion, International Searching Authority, U.S. Patent & Trademark Office, Alexandria, Virginia, Nov. 7, 2008.

* cited by examiner

*Primary Examiner* — Bhavesh Mehta
*Assistant Examiner* — Edward Park
(74) *Attorney, Agent, or Firm* — Maginot, Moore & Beck, LLP

(57) ABSTRACT

An image quality measuring method enables a biometric image to be evaluated to determine whether the biometric image data are adequate for identification processing. The method includes converting a biometric image to dimensionless image data, filtering the dimensionless image data with a band pass filter, identifying a plurality of portions in the filtered data as containing identification features, each portion in the plurality having an information measurement that indicates feature content greater than portions in the filtered data that are excluded from the plurality, and measuring clarity for the biometric image from the identified plurality of portions in the filtered data.

12 Claims, 4 Drawing Sheets

POLAR IMAGE OF (A)

POLAR MASK OF (A)

LOG-POLAR IMAGE OF (A)

LOG-POLAR MASK OF (A)

STEPS OF AUTOMATIC FEATURE EXTRACTION

FILTERED IRIS IMAGE OF FIG. 3D

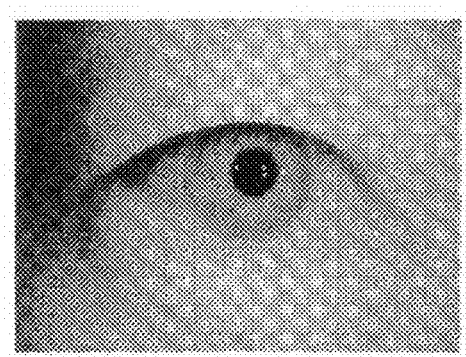
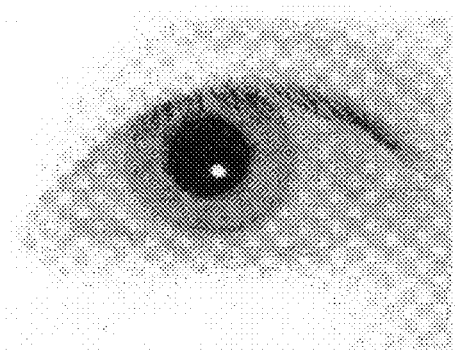
FIG. 5A  FIG. 5B
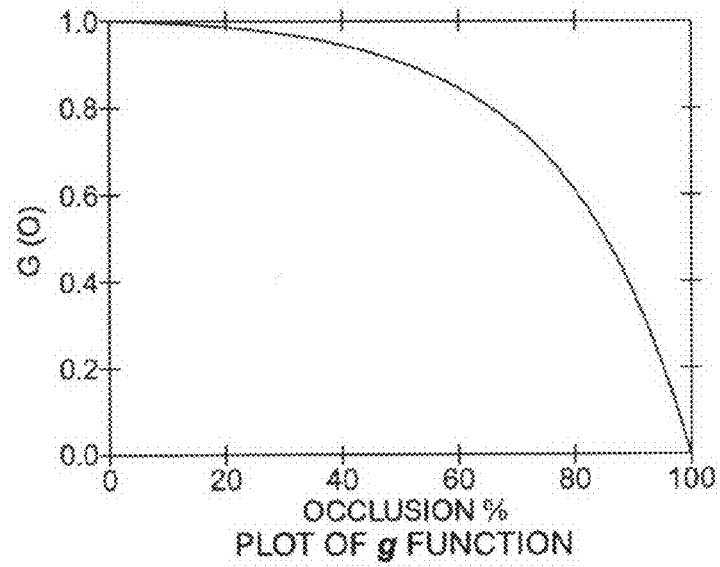
FIG. 6
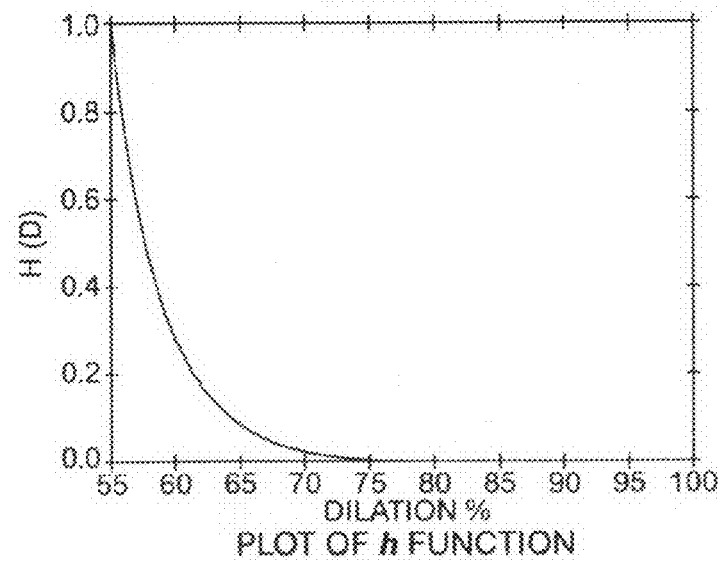
FIG. 7

SYSTEM AND METHOD FOR MEASURING CLARITY OF IMAGES USED IN AN IRIS RECOGNITION SYSTEM

This application claims priority from international application PCT/US2008/073298, which was filed on Aug. 15, 2008 and which claims priority from U.S. Provisional Application Ser. No. 60/964,797, which was filed on Aug. 15, 2007.

GOVERNMENT INTEREST

This invention was made with government support under grant N00014-07-1-0788, awarded by the Office of Naval Research. The government has certain rights to this invention.

TECHNICAL FIELD

The system and method disclosed below relates to biometric identification, and, more particularly, to identification systems that use images of a person's iris to identify the person.

BACKGROUND

Biometric identification systems are known. In these systems, an image is typically taken of some aspect of a person's physiology and information from the image is compared to stored data corresponding to that physiological aspect. The degree of correlation between the acquired image and the stored data determines whether the person corresponding to the acquired image is the person from which the stored data has been obtained. The stored data may correspond to a person's fingerprint, face, and/or voice. Each type of biometric possesses advantages and disadvantages. For example, fingerprints require contact with a person to obtain the image of the fingerprint for comparison to the stored data. Because contact with a person to be identified is not always possible, this form of identification may be problematic.

One reliable way of identifying persons at a distance has been identification of a person through an image of a human eye iris. The iris of a human eye possesses a pattern of high complexity that changes very little over the life of a person. Iris patterns are so unique that the iris patterns of the left and right eyes of the same person are different. Additionally, the iris patterns can be obtained at a distance using a near infrared (NIR) camera with an appropriate lens. The iris is protected by the cornea of an eye. The uniqueness and relatively minor changes in the iris under different environmental conditions makes the iris a good candidate for automated and highly reliable personal identification.

In previously known iris identification systems, such as the one disclosed in U.S. Pat. No. 5,291,560 to Daugman, an image of a person's eye is obtained and then processed to identify the portion of the eye that corresponds to the iris. Data from the iris that are not occluded by the eyelids may be used to generate a raw data signal. This signal may then be filtered using a pair of two-dimensional Gabor filters to extract pattern information from the raw data signal. The resulting data signal may be compared to stored data for identification purposes. In the Daugman reference, Hamming distances are selected to vary the criteria for evaluating an identification match.

The quality of the iris image that is used for identification evaluation considerably affects the accuracy of the system. Failures to detect imposters and false identification of imposters are more likely to occur with blurred iris images. Many factors affect the quality of an iris image. These factors include blurriness, resolution, image contrast, iris occlusion, and iris deformation. Blurriness, however, remains one of the most significant problems for iris image acquisition. Methods that have been used to evaluate the quality of an iris image have been adversely affected by occlusion of the iris that occurs from the eyelids covering a portion of the iris. Being able to assess the quality of an iris image would help ensure that an iris identification system is obtaining an iris image containing sufficient information for identifying a person.

SUMMARY

An image quality measuring method enables an evaluation of an iris image to determine whether the iris image is adequate for identification processing. The method may also be used to evaluate other types of biometric data. The method includes converting a biometric image to dimensionless image data, filtering the dimensionless image data with a band pass filter, identifying a plurality of portions in the filtered data as containing identification features, each portion in the plurality having an information measurement that indicates feature content greater than portions in the filtered data that are excluded from the plurality, and measuring clarity for the biometric image from the identified plurality of portions in the filtered data.

The method may be implemented by a system that evaluates biometric image data before a biometric recognition system processes the image for identification purposes. The system includes a preprocessor configured to convert biometric image data to dimensionless image data, a feature extractor configured to filter the dimensionless data with a band pass filter, a region of interest selector configured to identify a plurality of portions of the filtered image data, each portion in the plurality having an information distance that is indicative of feature content, and a feature information measurement generator configured to measure clarity of the biometric image from the portions in the plurality of portions.

BRIEF DESCRIPTION OF THE DRAWINGS

FIG. 5A is an image of a human eye in which identification features are scattered throughout the eye.

FIG. 5B is an image of a human eye in which identification features are clustered closely to the pupil.

FIG. 6 is a graphical representation of a normalization function used by the occlusion measurement generator of FIG. 1.

FIG. 7 is a graphical representation of a normalization function used by the dilation measurement generator of FIG. 1.

DETAILED DESCRIPTION

Figure 1:
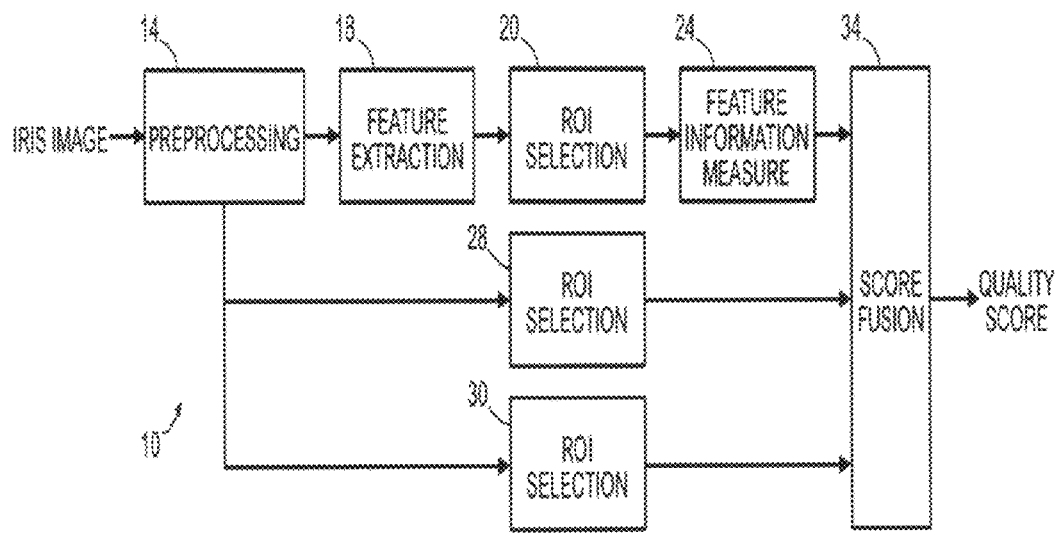
FIG. 1 is a block diagram of a system that computes a quality score for an iris image.

A system 10 for measuring quality of an iris image is shown in FIG. 1. The system is comprised of an image preprocessor 14, a clarity measurement generator 16, an occlusion measurement generator 28, a dilation measurement generator 30, and a quality score generator 34. The clarity measurement generator 16 includes a feature extractor 18, a region of interest selector 20, and a feature information measurement generator 24. In greater detail, the image preprocessor 14 receives an image of a human iris from a video camera or other image generating device. The preprocessor 14 extracts features from the iris image so appropriate regions of interest can be selected and information distances for the selected regions measured. The occlusion measurement generator 28 and the dilation measurement generator 30 also receive the iris image for generation of occlusion and dilation in the image. The image score generator 34 weights the feature information measurement, the occlusion measurement, and dilation measurement to generate a quality score for the image. This score indicates whether the iris image contains sufficient information for a reliable identification.

The system 10 may be implemented on a computer system having a processor and associated input/output circuitry and memory. For example, the system 10 may be a computer system having a CPU processor operating at 1 GHz. The system may also include a 1 GB hard drive and 256 MB of volatile memory, such as static RAM. The received image may be a 200×300 image. Alternatively, the clarity measurement generator, the dilation measurement generator and/or the occlusion measurement generator may be implemented with one or more application specific integrated circuits (ASIC) for performing the methods set forth in more detail below. In another embodiment, the clarity measurement generator, the dilation measurement generator, and the occlusion measurement generator may be implemented with programmed instructions stored in program memory for the general purpose processor. These instructions may be executed to extract and transform a portion of the iris image, measure the clarity, occlusion, and dilation of the image, and generate a quality score for the image. In addition, the system 10 may be integrated with an existing iris recognition system for quality measurement. When integrated with existing iris recognition systems, the preprocessor 14 may be replaced with the image data preprocessor of the existing system, if it performs the appropriate data transformations, to enable more computationally efficient processing.

Figure 2:
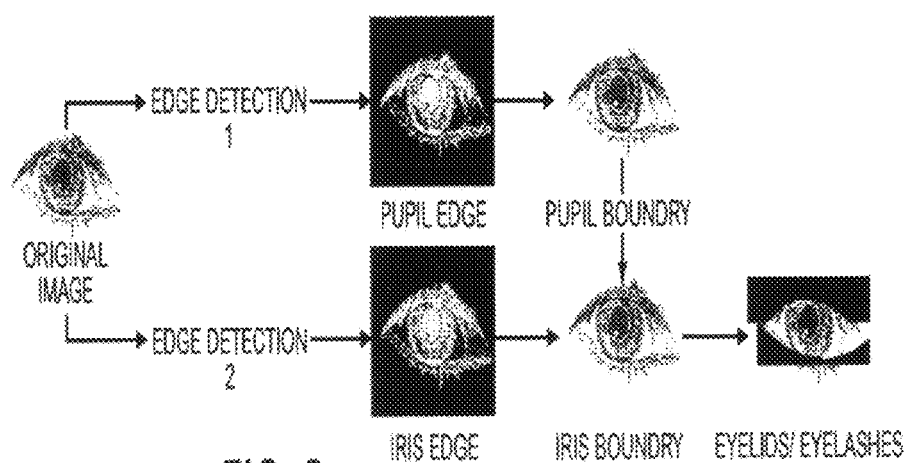
FIG. 2 shows an image of a human eye and the edges to be detected in the image.

In the preprocessor 14, the portion of the eye image corresponding to the iris is extracted from the image by detection of the pupil and limbic boundaries, the eyelids, and the eyelashes. The limbic boundary is a boundary between the outer circumference of the iris and the sclera or white portion of the eye. The pupil boundary is the meeting of the outer circumference of the pupil and the inner circumference of the iris. Eyelids and eyelashes typically occlude portions of the top and bottom regions of an iris image. To select the most accessible areas of an iris image, the image data are processed with a Canny edge detection method. Two thresholds are used for this method. A higher threshold is used to detect the pupil boundary and a lower threshold is used for detecting the limbic boundary. These physical boundaries and their corresponding edges in the image are depicted in FIG. 2.

The area that lies between the pupil and limbic boundaries that corresponds to iris data is segmented into multiple arcs. These arcs are located at various radii for a polar axis centered in the pupil. The radii may range, for example, from the pupil boundary to the quarter, half, three-quarters, and full length of the limbic radii. The segmented portions of the iris image are transformed from rectangular coordinates to polar coordinates to form rectangular image areas for processing. Because the iris pattern resolution and the actual distance between the pupil boundary and the limbic boundaries may be changed for the same iris by changes in image resolution, variances in camera-to-face distance, and pupil contraction/dilation, normalization of the segmented iris region is required when the transformation to polar coordinates is computed. For each pixel in the original iris image located at rectangular coordinates $(x_i, y_i)$, the polar coordinates $(r_i, \theta_i)$ may be computed as:

$$r_i = \frac{\tilde{L}}{L}\left(\sqrt{(x_i - x_0)^2 + (y_i - y_0)^2} - r_0\right)$$

$$\theta_i = \begin{cases} \frac{1}{\Delta\Theta}\arcsin\left(\frac{y_i - y_0}{x_i - x_0}\right) & y_i \geq y_0 \\ \frac{1}{\Delta\theta}\left[\arcsin\left(\frac{y_i - y_0}{x_i - x_0}\right) + \pi\right] & y_i < y_0. \end{cases}$$

In this transform, $(x_0, y_0)$ is the center of the pupil, $r_0$ is the pupil's radius, and L is the actual distance between the pupil and limbic boundaries in the original image. $\tilde{L}$ is the selected normalized distance. The selected angular resolution in the double dimensionless polar axis is $\Delta\Theta$. As a result, the normalized length in the angular direction is $$\frac{2\pi}{\Delta\Theta}.$$

Thus, the original image is transferred to a polar coordinate system with sides $\tilde{L}$ by $$\frac{2\pi}{\Delta\Theta}.$$

The resulting polar coordinates are sometimes called classic polar coordinates.

Log-polar coordinates $(r_i^{log}, \Theta_i^{log})$ may also be calculated for the normalization as $$r_i^{log} = \frac{\tilde{L}\log(r_i/r_0)}{\log(r_{lim}/r_0)},$$

where $r_{lim}$ is the limbic radius. $\theta_i^{log}$ can be calculated as $\theta_i$ was calculated above. Thus, the iris data are transferred to a double dimensionless log-polar coordinate space with size $\tilde{L}$ by $$\frac{2\pi}{\Delta\theta}.$$

Figure 3A:
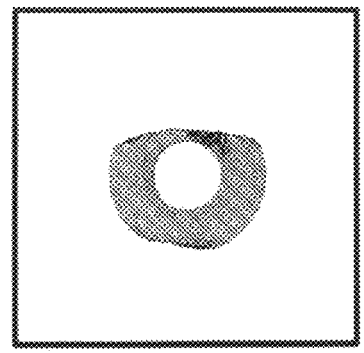
FIG. 3A is a depiction of a segmented iris image.
Figure 3B:
FIG. 3B is the image of FIG. 3A converted to classic polar coordinate space.
Figure 3C:
FIG. 3C is the image of a mask derived from the image of FIG. 3A that has been converted to classic polar coordinate space.
Figure 3D:
FIG. 3D is the image of FIG. 3A converted to log-polar coordinate space.
Figure 3E:
FIG. 3E is the image of a mask derived from the image of FIG. 3A that has been converted to log-polar coordinate space.

FIG. 3A shows a segmented iris region, while FIG. 3B is the corresponding polar coordinate image of the segmented iris region and FIG. 3D is the corresponding log-polar image. Comparing FIG. 3D to FIG. 3B reveals the log-polar image has a higher resolution. The preprocessor 14 may be configured to convert the image data to only one of the two dimensionless coordinate systems or to both of the dimensionless coordinate systems. Using the segmented iris image, a mask may also be developed and transformed to the classic polar coordinate space as well as the log-polar coordinate space. FIG. 3C and FIG. 3E depict representations of the mask in these coordinate spaces. The mask representations are provided to the occlusion measurement generator 28 and the dilation measurement generator 30 for generation of the occlusion measurement and dilation measurement, respectively.

The image normalization achieved through the described transformations help maximize the rows of data in image data for further processing. Although the increments from the pupil boundary to the limbic boundary are the same for each image, the angle θ varies in accordance with the amount of occlusion. By varying the angle θ, the length of the rows in a transformed arc are maximized to provide the most information for analysis in each iris image.

After the preprocessor 14 has extracted and transformed the arcs for the iris image, the transformed arcs are provided to the feature extractor 18 for clarity analysis. The feature extractor 18 performs a frequency transform on each row of each polar image and then the transformed rows are filtered with a one-dimensional (1D) Gabor transform filter. The filtered row data are returned to the polar coordinate space for further analysis.

Figure 4A:
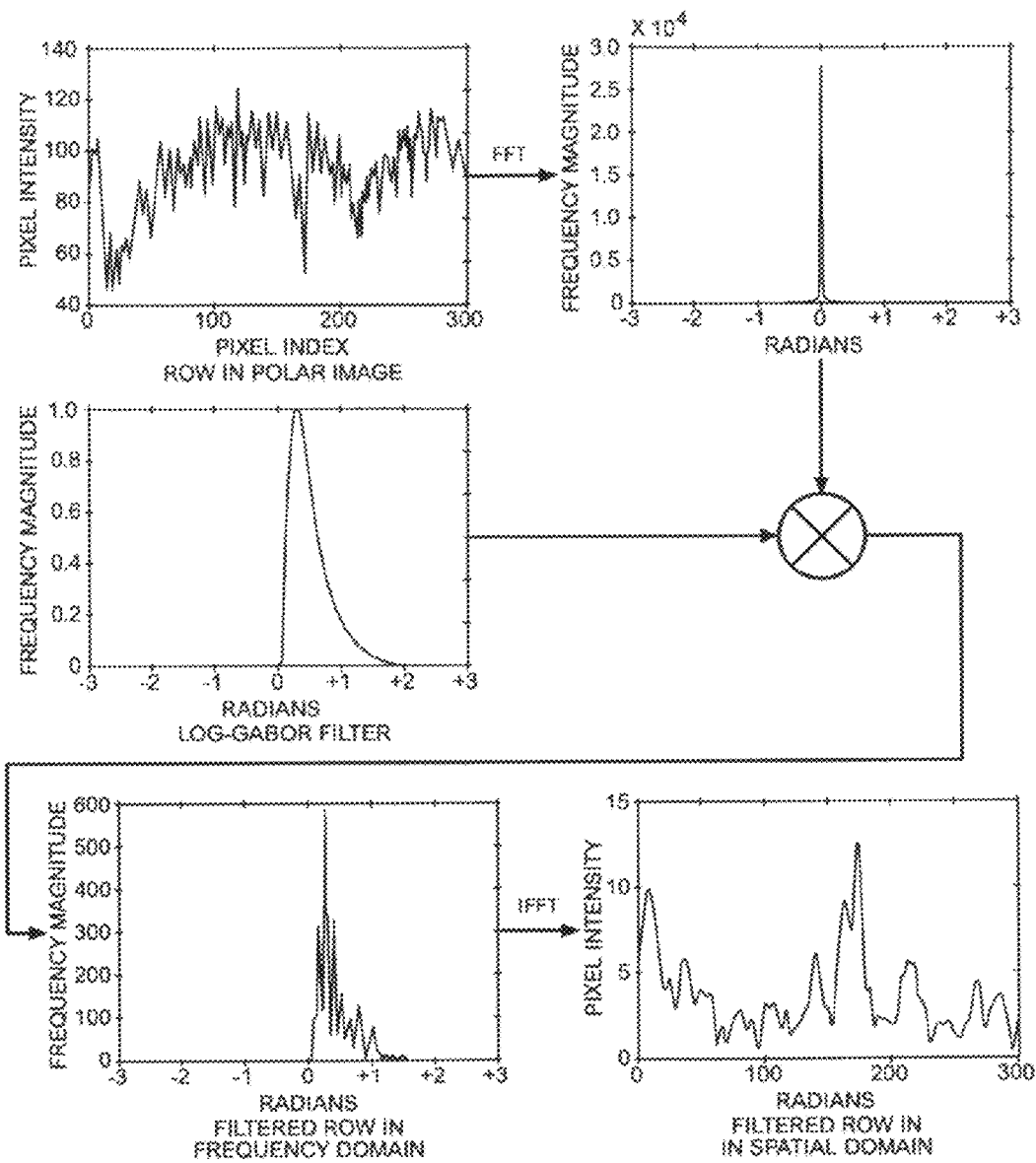
FIG. 4A is a graphical representation of processing performed by the feature extractor shown in FIG. 1.

The processing of the feature selector 18 is shown in FIG. 4A. In more detail, a one dimensional fast Fourier transform (FFT) is applied to a row of data within one of the polar or log-polar images (block 200). The FFT transforms the dimensionless data to the spatial domain so the frequency characteristics from −π to π radians can be analyzed. The highest and lowest frequencies are removed using a Log-Gabor band pass filter (block 204). The highest frequencies are removed to diminish the effects of noise and artifacts that are not intrinsic to an iris pattern. The lowest frequencies are removed to diminish the effects of any DC component in the signal. This processing enables the frequencies that represent the iris pattern in an arc to be isolated.

The Log-Gabor transform applied to the transformed rows has the mathematical form:

$$G(\omega) = e^{\frac{-\log(\omega/\omega_0)^2}{2\log(\sigma)^2}}$$

Other types of band pass filters may be used alternatively. Band pass filters have been shown to be effective in iris pattern extraction as described in the Daugman patent. In the form of the band pass filter described by the equation above, σ is used to control the filter band width and $\omega_0$ is the filter center frequency. The center frequency is derived from the filter wavelength λ. For a filter that removes the highest and lowest frequencies, the following parameters have been determined from empirical analysis:

$$\sigma = 0.2, \quad \omega_0 = \frac{1}{\lambda}, \quad s = \text{number of pixels in a row, and } \lambda = \frac{s}{40}.$$

Figure 4B:
FIG. 4B depicts the image of FIG. 3D after it has been through the process shown in FIG. 4A.

The filtered row is returned from the spatial domain to the dimensionless polar coordinate space with an inverse FFT (block 208). FIG. 4B depicts a filtered representation of the log-polar image shown in FIG. 3D.

A blurry iris image is much more homogenous than a clear image. Consequently, the distribution of patterns in a blurry image is closer to a uniform distribution than the distribution in a clear image. Therefore, the information distance between the selected features and the uniform distribution provides a measure of the image's clarity. The information distance not only describes the randomness of the features, but it also may be used to generate high-order statistics of an iris image based on its features. If the magnitude of a selected feature is $\bar{r}$, the probability mass function is $$\bar{p} = \frac{\bar{r}}{\|\bar{r}\|_2},$$

where the denominator is 2-norm. If the size of a selected feature is L, then the uniform distribution can be calculated as $$\bar{q} = \frac{1}{L}.$$

The information distance is $$J(\bar{p}, \bar{q}) = D(\bar{p}\|\bar{q}) + D(\bar{q}\|\bar{p}),$$

$$\text{where } D(\bar{p}\|\bar{q}) = \sum \bar{p}_i \log_2 \frac{\bar{p}_i}{\bar{q}_i} \text{ and } D(\bar{q}\|\bar{p}) = \sum \bar{q}_i \log_2 \frac{\bar{q}_i}{\bar{p}_i}.$$

These last two entities are relative entropies that are generally not equal to one another, but $J(\bar{p},\bar{q})=J(\bar{q},\bar{p})$.

As shown in FIG. 5A, some iris images contain distinguishable patterns throughout the iris region, while others, as shown in FIG. 5B, only contain distinguishable patterns in the inner rings closest to the pupil. Thus, if the entire iris region is evaluated, images containing pattern data only in areas close to the pupil may be difficult to distinguish from blurry images. Consequently, region of interest selector 20 uses a sliding window to select non-occluded portions of iris features having the highest information distances as calculated above. If a window length L has a start location at (u,v), the filtered magnitude values of the L pixels in the window form a vector $\bar{r}$. The probability mass functions $\bar{p}$ of this selected portion and the uniform distribution calculated above may be used to identify the information distance $J^{(u,v)}(\bar{p}, \bar{q})$ for the portion within the window. The information distance indicates whether the portion within the window contains identification feature content. The portion of the row having the largest information distance is stored as the representative information distance for a row. If the total number of consecutive non-occluded pixels in a row is smaller than L, the information distance for that row is set to zero.

Because the inner circles for an iris image contain more distinguishable patterns, their distance measurements are more heavily weighted. The weights may be determine in the following manner: $WJ_i=(1-ke^{j*i})*J_i$, where k and l are constants. By empirical determinations, k=1/33 and l=0.1. $J_i$ is the representative information distance for the ith row. The N rows having the largest weighted representative information distances, which indicate feature content, are then selected as regions of interest.

To prevent severely blurred images from producing large information distances, the distributions are normalized. Large information distances may arise from the random perturbations in the data, which is essentially noise. Therefore, a threshold value $T_{max}$ may be used to preclude this condition. The threshold is used by either comparing the distance computed for row portion having the highest score or a mean score for a row to the threshold. If the score is less than the threshold, the representative information for the row is set to zero. The selected regions of interest are provided to the feature information measurement score generator 24. This generator calculates the measurement as $$FIM = \frac{1}{N} \sum_i WJ_i,$$

where i is the row with the ith top weighted representative information distance and N is the total number of portions used for feature information calculation.

The occlusion measurement generator 28 also receives the dimensionless iris image data from the preprocessor 14. Generator 28 uses the dimensionless image and dimensionless mask data to measure how much of the iris area contains insufficient data for recognition. The occlusion measurement O is expressed as a percentage according to the following formula:

$$O = \frac{\text{Invalid area in the segmentation mask}}{\text{Segmentation mask size}} \times 100\%.$$

Likewise, the dilation measurement generator 30 receives the dimensionless data of the iris image and its mask to measure the amount of iris dilation. If the iris is too dilated, insufficient information is available in the image for recognition. The dilation measurement D is calculated as:

$$D = \frac{\text{Pupil radius}}{\text{Iris radius}} \times 100\%.$$

The measurements obtained by the feature information measurement generator 24, the occlusion measurement generator 28, and the dilation measurement generator 30 are provided to the quality score generator 34. These measurements are combined to produce a single quality score for the iris image. The quality score Q is determined as Q=f(FIM)·g(O)·h(D), where f( ), g( ), and h( ) are normalization functions. The function f normalizes the FIM score from 0 to 1 as follows:

$$f(FIM) = \begin{cases} \alpha \cdot FIM, & 0 \leq FIM \leq \beta \\ 1, & FIM > \beta \end{cases}$$

and $\beta=0.48$ and $\alpha=1/\beta$. Because the relationship between available iris patterns and iris recognition accuracy is not linear, the function g is calculated as $g(O)=1-Ke^{\lambda \cdot O}$, where $\kappa=0.011$ and $\lambda=4.5$. A plot of the function g is shown in FIG. 6. Dilation is also non-linear and the function h is calculated as $h(D)=\xi e^{-\gamma D}$, where $\xi=1\times10^{-6}$ and $\gamma=25$. In application of the above described system and method to other types of biometric data, occlusion may be understood as referring to obstructions to portions of the image on its outer boundary while dilation may be understood as referring to obstructions within the interior of the image.

Those skilled in the art will recognize that numerous modifications can be made to the specific implementations described above. While the embodiments above have been described with reference to specific applications, embodiments addressing other applications may be developed without departing from the principles of the invention described above. For example, while the image quality evaluation system has been described as being used with an iris recognition system, it may also be used with other identification systems that use biometric image data. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A method for measuring quality of a biometric image comprising:
    converting a biometric image to dimensionless image data;
    filtering the dimensionless image data with a band pass filter;
    applying a sliding window to the filtered dimensionless image data to identify portions for information distance calculations;
    generating an information distance for the portions of the filtered data identified by the sliding window;
    weighting information distances for selected portions identified by the sliding window;
    ranking the weighted information distances;
    selecting a number N portions corresponding to the N weighted information distances that are larger than the other weighted information distances in the ranking of the weighted information distances to identify a plurality of portions in the filtered dimensionless image data as containing identification features; and
    measuring clarity for the biometric image from the identified plurality of portions in the filtered dimensionless image data.

2. The method of claim 1, the biometric image conversion further comprising:
    converting biometric image data into polar coordinate image data.

3. The method of claim 2 further comprising:
    converting the dimensionless image data to spatial domain data; and
    converting the spatial domain data to dimensionless data following application of a Log-Gabor band pass filter to the spatial domain data.

4. The method of claim 1, the biometric image conversion further comprising:
    converting biometric image data into log-polar coordinate image data.

5. The method of claim 1, the filtering of the dimensionless image data further comprising:
    applying a Log-Gabor filter to the dimensionless image data.

6. The method of claim 1 further comprising:
    measuring occlusion in the dimensionless biometric image.

7. The method of claim 6 further comprising:
    measuring dilation in the dimensionless biometric image.

8. The method of claim 7 further comprising:
generating a quality measurement for the biometric image from the clarity measurement, the occlusion measurement, and the dilation measurement.

9. A system for measuring quality of a biometric image comprising:
a preprocessor configured to convert biometric image data to one of polar coordinate data and log-polar coordinate data to form dimensionless image data;
a feature extractor having a domain converter configured to convert the dimensionless image data to spatial domain data, a Log-Gabor filter for filtering the spatial domain data, and an inverse domain generator configured to convert the filtered spatial domain data to the dimensionless data coordinates from which the domain converter converted the dimensionless image data for filtration;
a region of interest selector configured to identify a plurality of portions of the filtered image data, each portion in the plurality of portions having an information distance that is indicative of feature content, and to weight the information distances for portions selected from the plurality of portions to enable the feature extractor to rank the weighted information distances measured for the selected portions; and
a feature information measurement generator configured to measure clarity of the biometric image from the ranked weighted information distances measured for the selected portions in the plurality of portions.

10. The system of claim 9, the region of interest selector further comprising:
a sliding window to select the portions of the filtered dimensionless data for information distance calculations; and
a information distance generator for measuring the information distance for each portion selected by application of the sliding window to the filtered dimensionless data.

11. The system of claim 9 further comprising:
an occlusion measurement generator configured to measure occlusion in the biometric dimensionless image data; and
a dilation measurement generator configured to measure dilation in the biometric dimensionless image data.

12. The system of claim 11 further comprising:
an image quality measurement generator for generating a quality measurement for the biometric image from the clarity measurement, the occlusion measurement, and the dilation measurement.

* * * * *